S. A. ADDIS.
SUGAR DISTRIBUTING BOWL.
APPLICATION FILED JAN. 15, 1913.
1,084,873.
Patented Jan. 20, 1914.
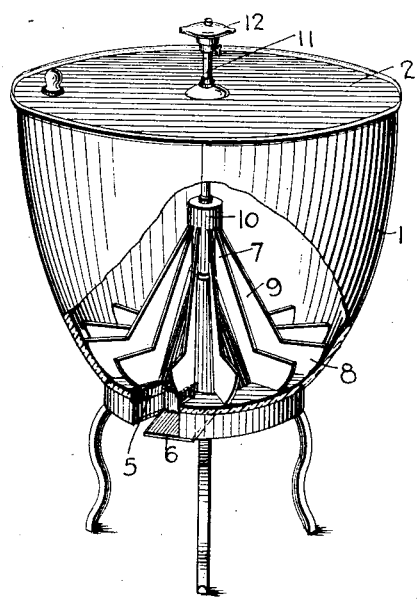
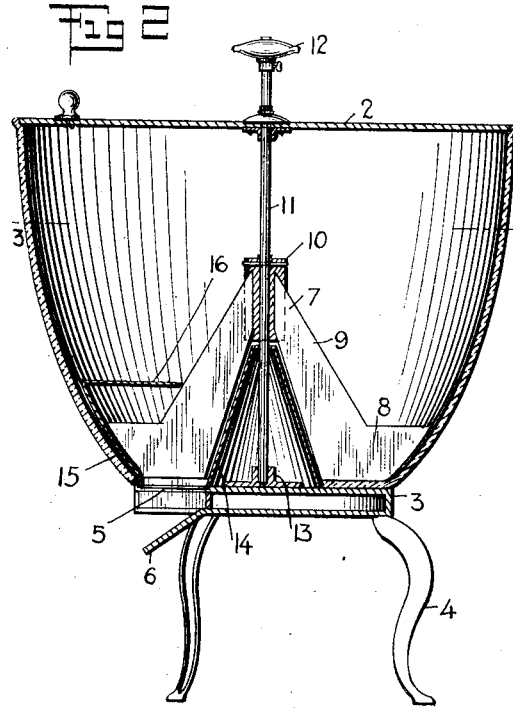
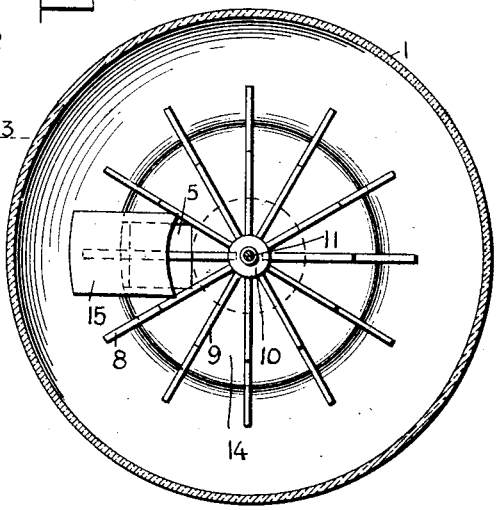
WITNESSES
C. J. Hachenburg
A. L. Kitchin
INVENTOR
Samuel A. Addis
BY Munn&Co.
ATTORNEYS

UNITED STATES PATENT OFFICE.

SAMUEL A. ADDIS, OF NEW YORK, N. Y.

SUGAR-DISTRIBUTING BOWL.

1,084,873.  Specification of Letters Patent.  Patented Jan. 20, 1914.

Application filed January 15, 1913. Serial No. 742,179.

*To all whom it may concern:*

Be it known that I, SAMUEL A. ADDIS, a citizen of the United States, and a resident of the city of New York, borough of Bronx, in the county of New York and State of New York, have invented a new and Improved Sugar-Distributing Bowl, of which the following is a full, clear, and exact description.

This invention relates to improvements in distributing devices, and particularly to improved loaf sugar distributing device.

The object in view is to provide an improved sugar bowl designed to dispense or feed one piece of sugar at a time therefrom, the feeding means being adapted to be operated at any desired speed so as to feed the sugar from the bowl at a rapid rate or comparatively slowly.

A further object of the invention is to provide a bowl formed with an opening in the bottom and a rotating feeding member formed with dividing partitions having upwardly extending flanges for separating and feeding sugar to the opening so that only one piece or lump of sugar is dispensed or fed from the bowl at a time, a suitable rotating member being arranged at the top of the bowl for causing the proper operation of the feeding mechanism.

In carrying out the objects of the invention, a bowl structure of any desired kind is provided, having a top and a base supported by legs, or in any other way, as may be desired. The base is formed with an aperture and a guiding chute. The aperture is adapted to allow loaf sugar to pass through the base and be guided by the chute into a cup or other receptacle held adjacent thereto. Within the bowl is a rotatable stirring and feeding member, divided into sections or compartments by division plates which extend upwardly any desired distance and are connected with a central operating shaft which projects preferably to a suitable position above the top of the bowl where the same may be easily operated by a suitable enlargement or hand operated member. The top of the bowl is covered by a suitable lid or cover so that contact with the sugar cannot be had without going to some considerable trouble to remove the cover, and in this way the sugar is maintained clean.

A practical embodiment of the invention is represented in the accompanying drawings forming a part of this specification, in which similar characters of reference indicate corresponding parts in all the views.

Figure 1 is a perspective view of the bowl with certain parts broken away, the same showing an embodiment of the invention; Fig. 2 is a longitudinal vertical section through the structure shown in Fig. 3; and Fig. 3 is a section through Fig. 2 on the line 3—3.

Referring to the accompanying drawings by numerals, 1 indicates a bowl which may be of glass or any desired material, and 2 a cover or top member which may be constructed in any suitable manner for making a reasonably tight joint with the bowl 1, and which may be removed whenever desired, although ordinarily the same is left in place until the bowl has been emptied. The bowl 1 is mounted on a base 3 formed in any desired way, preferably of metal, and provided with any kind of supports, as for instance legs 4, which may rest on any desired support loosely or may be fastened thereto, without departing from the spirit of the invention. One part of the bottom 3 is provided with an aperture or opening 5, and with a chute or guide 6 so that sugar may pass through aperture 5 and be guided by chute 6 to a cup or other article held beneath the chute.

In using the bowl, loaf sugar is intended to be vended or dispensed and by the arrangement of the aperture 5 and chute 6, the sugar will move out of the bowl one lump at a time according to the rotation of the stirring and dispensing member 7. The stirring and dispensing member 7 is provided with a plurality of partitioning blades 8 merging into an upwardly diagonally positioned web 9 secured to a suitable spool or base 10. The base 10 is pinned or otherwise rigidly secured to the shaft 11 so as to rotate therewith when the thumb member 12 above the cover 2 is rotated. The lower end of shaft 11 may be journaled in any suitable fitting 13 so that the distributing member 7 will properly operate. It will be noted especially from Fig. 2, that a cone 14 is provided centrally of the webs 9 so that none of the sugar can lodge inside of the bowl but must gravitate toward the aperture 5 when moved to that position by members 8 or the webs 9.

In order that the sugar may not continually feed from bowl 1, an extension 15 is provided which preferably projects from base 3, this extension being formed with an overlapping portion 16 designed to substantially cover aperture 5, but to be positioned above the upper edge of member 8 in order that the sugar may be brought one lump at a time beneath member 16 and to aperture 5 so as to feed through the aperture on the chute 6. It will be noted that by reason of the webs 9, the various lumps of sugar will be engaged at a point above members 8 and guided downwardly until they are positioned between members 8 where they will remain until brought opposite opening 5. Preferably the members 8 are spaced a sufficient distance apart for freely accommodating one lump of sugar so that only one lump of sugar will be vended or dispensed at one time, but it will be evident that members 8 could be spaced a sufficient distance apart for dispensing more than one lump at a single operation. It will also be noted that by the construction and arrangement disclosed the sugar will be vended or caused to move through aperture 5 regardless of the direction of rotation of shaft 11 and associated parts so that any one operating the device will be sure to operate the same correctly.

Having thus described my invention I claim as new and desire to secure by Letters Patent:—

1. In a loaf sugar dispensing bowl, a body portion formed with an aperture in the lower part thereof, a cover for said body portion a base formed with a guiding chute for guiding sugar forced through said aperture, a covering member supported by said base and arranged at a predetermined distance above said aperture, a feeding mechanism arranged in said body formed with a plurality of partitions adapted to be successively brought beneath said covering member, each of said partitioning members being formed with a web extending toward a central point in said body, an operating shaft extending through said cover, means for rigidly securing said webs to said shaft whereby said webs and the partitions associated therewith will be rotated as said shaft is rotated, and a conical member positioned to occupy the central space between said partitioning members and said webs whereby the sugar in said bowl will be caused to move under the action of gravity toward the space between the partitioning members whereby the same may be brought successively to a position over said discharge aperture as the partitioning members are rotated by said shaft.

2. In a sugar dispensing bowl, a body portion formed with an aperture in the lower part thereof, a base formed with an opening registering with said aperture, a covering member supported by said base and arranged a predetermined distance above said aperture, a feeding mechanism arranged in said body formed with a plurality of partitions adapted to be successively brought beneath said covering member, an operating shaft, means for rigidly securing said partitions to said shaft whereby said partitions will be rotated as the shaft is rotated, a substantially conical-shaped member surrounding one end of said shaft and occupying the space between said shaft and said partitioning members, whereby the sugar in said bowl will be caused to move under the action of gravity toward the space between the partitioning members whereby the same may be brought successively to a position over said discharge aperture as the partitioning members are rotated by said shaft.

In testimony whereof I have signed my name to this specification in the presence of two subscribing witnesses.

SAMUEL A. ADDIS.

Witnesses:
A. L. KITCHIN,
PHILIP D. ROLLHAUS.